Patented May 12, 1931 1,804,417

UNITED STATES PATENT OFFICE

OTTO HERTING, OF PHILADELPHIA, PENNSYLVANIA, ASSIGNOR TO SANI PAPER PRODUCTS CO. INC., OF PHILADELPHIA, PENNSYLVANIA, A CORPORATION OF DELAWARE

COMPOSITION FOR AND METHOD OF HEAT AND FIRE PROOFING PAPER, CRAFT BOARD, AND THE LIKE

No Drawing. Application filed June 15, 1926. Serial No. 116,238.

My invention relates to a composition for and method of heat and fire proofing paper, craft board and the like.

The object of my invention is to provide a composition for and method of heat and fire proofing paper, craft board and the like in order to enable the production of cooking utensils, as for example, pie plates, therefrom.

A further object of my invention is to produce a composition which will give to the material to which it is applied a rigidity, which will insure the substantial retention of a desired shape given to the material, thus enabling the use of relatively light material for many purposes.

Further objects of my invention are to provide a composition which will be economically produced and utilized and which will be wholly non-poisonous and efficient, especially for use in connection with the production of cooking utensils.

Having now indicated, in a general way, the nature and purpose of my invention, I will proceed to a detailed description thereof, it being understood that the formulæ and mode of operation hereinafter described shall not be taken to limit in any way the scope of my invention or the claims forming a part thereof.

In accordance with my invention, I provide two solutions and treat the material to be heat and fire proofed in the solutions successively. The solutions are of such a nature that one or more of the ingredients of the first solution absorbed by the material, will react chemically with one or more of the ingredients of the second solution to form within the material treated an ingredient which will give rigidity to the material when dry and act to make it resistant to heat.

In accordance with my invention, I prepare two solutions which for clarity I will designate solution A and solution B. The material which is to be treated is then dipped in solution A, the solution being warmed or heated, after which it is dipped in solution B, the solution being warmed or heated. Ingredients of the solutions react chemically and form substances within the material, which when dry, act to make the material rigid and resistant to heat. Further, the substances formed contain water of combination which on the application of heat to a product formed from the treated material, as in an oven, will be released and will prevent charring of the material.

The solution A is composed of a sulphate such as aluminum, magnesium, iron, manganese or other harmless sulphates, and titanium or zirconium sulphate dissolved in water. The proportions of the sulphates and of the water may be varied substantially, but I have found that the proportions set forth in the following formulæ by way of example, will give satisfactory results.

Solution A

Aluminum sulphate_____ 8 oz.
Titanium sulphate_____ ½ oz.
Water_____ 1 gallon

Solution A

Aluminum sulphate_____ 6 oz.
Iron sulphate_____ 2 oz.
Zirconium sulphate_____ ½ oz.
Water_____ 1 gallon The solution B is composed of silicate of soda, sodium borate, or borax, and sodium sulphate dissolved in water. The proportions of the ingredients of solution B may be varied substantially, it being important, however, that the silicate of soda be in excess. I have found that the proportions set forth in the following formula, by way of example, will give satisfactory results.

Solution B

Sodium sulphate_____ 10 lbs.
Sodium borate (borax)_____ 5 lbs.
Silicate of soda solution
 (preferably 39° B)_____ 14 gallons
Water_____ 28 gallons Having prepared the two solutions, and it being assumed, for example, that the material to be treated is craft board, the craft board is saturated with solution A by any convenient means, as by dipping into the solution, the solution having been previously heated to a temperature of from say 140° F.–180° F. When the craft board is saturated, it is removed from the solution and partially dried, to remove excess of solution A, and then dipped in solution B, likewise heated to a temperature of from say 140° F. to 180° F., whereupon admixture of the ingredients takes place in the presence of water.

When the craft board, impregnated with solution A, is dipped in solution B, a chemical reaction takes place between the aluminum sulphate and the silicate of soda and the titanium sulphate and the silicate of soda, which results in the formation of an aluminum and of a titanium silicate within the body of the craft board.

After treatment in the second solution, the craft board is again partially dried and while moist is formed by means of dies into any desired shape, which on further drying will be retained.

In view of the fact that the commercial silicate of soda contains more or less free caustic soda which is slow drying and requires long exposure to air in order to absorb carbonic acid from the air thereby forming sodium carbonate, the drying of the craft board, after treatment in solution B, would under ordinary conditions require a substantial length of time.

In order to facilitate the drying of the craft board after treatment in solution B or, in other words, to hasten the reaction between the carbonic acid of the air and the caustic soda. I introduce compressed air into solution B. The reaction may be noted thus:—

$$CO_2(air) + 2Na(OH) - Na_2CO_3 + H_2O$$

Alternatively, solution B may be treated with sodium bicarbonate to convert the free caustic soda, the reaction being:

$$NaOH + NaHCO_3 \rightarrow Na_2CO_3 + H_2O.$$

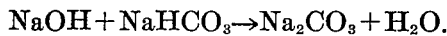

In the treatment of materials in accordance with my invention, if the material is possessed of a reasonable inherent stability of rigidity, as is craft board, from the inclusion in its composition of suitable ingredients, it will be only necessary to treat the material once. If, on the other hand, the material, as paper, have insufficient inherent rigidity, its rigidity may be substantially increased by a second treatment in solution B.

After the craft board or other material has been removed from solution B, it is partially dried and, as has been indicated, while still moist is blanked and formed into the desired shape after which it is completely dried not, however, sufficiently to remove water of combination.

The material, after complete drying, will be impregnated if treated with solutions A and B with crystallized aluminum and titanium silicates, which act respectively to add stability or stiffness to the material and to harden it, and both act as fire proofing agents. The aluminum and titanium silicates contain water of combination, which on heating of the material will be released as steam and act to prevent charring of the material. The material will contain borax, which acts as a drier and to prevent sticking of the material to forming dies in the forming or shaping process and also aids in fireproofing. There will also be present sodium sulphate, which contains a large amount of water of combination and sodium silicate, which aids in the fireproofing.

While aluminium and titanium silicates are referred to above for simplicity, it appears that the insoluble products formed are of rather indefinite composition and probably include compound silicates containing alkali.

It will now be observed that in accordance with my invention paper, craft board and the like may be made resistant to heat or fireproofed by the use of substances entirely harmless to human beings, thus enabling the production, for example, of cooking vessels from paper, craftboard and the like.

The material treated in accordance with my invention may be readily formed in desired shapes and will have no tendency to stick to dies or other forming apparatus and when used for the production of cooking vessels, as for example pie plates, will be found to be heat proof at oven temperatures, entirely harmless and of great advantage due to a capacity to absorb grease or juices. The material is of further advantage, especially for plates or pans for baking, since pies or bread will not adhere to it.

The heat resistance of the material treated in accordance with my invention arises from the presence within the body or structure of the material of the silicates formed by the reaction between the ingredients with which it is first saturated or impregnated in solution A and the ingredients of solution B and by the presence within the body or structure of the material of impregnating materials containing water of combination which on release at oven temperature, prevents charring.

Having now fully described my invention, what I claim and desire to protect by Letters Patent is:—

1. A heat resisting material comprising a fibrous material impregnated with titanium silicate.

2. A heat resisting material comprising a fibrous material impregnated with titanium silicate and a sulphate containing water of combination.

3. A heat resisting material comprising a fibrous material impregnated with titanium silicate, sodium sulphate and water glass.

4. The method of treating fibrous material to render it resistant to heat, which includes treating the material with a solution containing titanium sulphate and then treating with a solution containing water glass.

5. The method of treating fibrous material to render it resistant to heat, which includes treating the material with a solution containing titanium sulphate and then treating with a solution heated to 140° F.–180° F. and containing water glass.

6. The method of treating fibrous material to render it resistant to heat, which includes treating the material with a solution heated to 140° F.–180° F. and containing titanium sulphate and then treating with a solution heated to 140° F.–180° F. containing water glass.

7. The method of treating fibrous material to render it resistant to heat, which includes treating the material with a solution heated to 140° F.–180° F. and containing titanium sulphate, partially drying the material, treating the partially dried material in a solution heated to 140° F.–180° F. containing water glass and drying without removing the water of combination.

8. The method of treating fibrous material to render it resistant to heat including precipitating on the fibres thereof a water insoluble heat resistant composition resulting from the interaction in the presence of water of a soluble silicate and a soluble titanium salt.

9. The method of treating fibrous material to render it resistant to heat including precipitating on the fibres thereof a water insoluble heat resistant composition resulting from the interaction in the presence of water of a soluble silicate, a soluble aluminium salt and a soluble titanium salt.

10. The method of treating fibrous material to render it resistant to heat including impregnating the material with a water insoluble heat resistant composition resulting from the interaction in the presence of water of a soluble silicate and a soluble titanium salt.

11. The method of treating fibrous material to render it resistant to heat including impregnating the material with a water insoluble heat resistant composition resulting from the interaction in the presence of water of a soluble silicate, a soluble aluminium salt and a soluble titanium salt.

12. The method of treating fibrous material to render it resistant to heat including impregnating the material with products resulting from the interaction in the presence of water of sodium silicate and titanium sulphate.

13. The method of treating fibrous material to render it resistant to heat including impregnating the material with products resulting from the interaction in the presence of water of sodium silicate, aluminium sulphate, and titanium sulphate.

14. The method of treating fibrous material to render it resistant to heat including impregnating the material with products resulting from the interaction in the presence of water of sodium silicate, sodium borate, aluminium sulphate and titanium sulphate.

15. A heat resisting fibrous material having the fibres thereof associated with a water insoluble heat resistant composition precipitated directly upon the fibres by the admixture in the presence of water in the presence of the fibres of a soluble silicate and a soluble titanium salt.

16. A heat resisting fibrous material having the fibres thereof associated with a water insoluble heat resistant composition precipitated directly upon the fibres by the admixture in the presence of water in the presence of the fibres of a soluble silicate, a soluble aluminium salt and a soluble titanium salt.

17. A heat resisting fibrous material having the fibres thereof associated with a water insoluble heat resistance compositon resulting from the interaction in the presence of water of a soluble silicate and a soluble titanium salt.

18. A heat resisting fibrous material having the fibres thereof associated with a water insoluble heat resistant composition resulting from the interaction in the presence of water of a soluble silicate, a soluble aluminium salt and a soluble titanium salt.

19. A heat resisting fibrous material having the fibres thereof associated with products resulting from the interaction in the presence of water of sodium silicate and titanium sulphate.

20. A heat resisting fibrous material having the fibres thereof associated with products resulting from the interaction in the presence of water of sodium silicate, aluminium sulphate, and titanium sulphate.

21. A heat resisting fibrous material having the fibres thereof associated with products resulting from the interaction in the presence of water of sodium silicate, sodium borate, aluminium sulphate, and titanium sulphate.

22. The method of treating fibrous material to render its resistant to heat including impregnating the material with products resulting from the admixture in the presence of water of sodium silicate, sodium borate, sodium sulphate and aluminium sulphate.

23. A heat resisting fibrous material having the fibres thereof associated with a heat resistant composition incorporated directly upon the fibres by the admixture in the presence of water in the presence of the fibres of sodium silicate, sodium borate, sodium sulphate and aluminium sulphate.

24. The method of treating fibrous material to render it resistant to heat including impregnating the material with products resulting from the admixture in the presence of water of a soluble silicate, sodium borate, sodium sulphate and a soluble aluminium salt.

25. A heat resisting fibrous material having the fibres thereof associated with a heat resistant composition incorporated directly upon the fibres by the admixture in the presence of water in the presence of the fibres of a soluble silicate, sodium borate, sodium sulphate and a soluble aluminium salt.

26. The method of treating fibrous material to render it resistant to heat including impregnating the material with products resulting from the admixture in the presence of water of sodium silicate, sodium borate and aluminium sulphate.

27. A heat resisting fibrous material having the fibres thereof associated with a heat resistant composition incorporated directly upon the fibres by the admixture in the presence of water in the presence of the fibres of sodium silicate, sodium borate, and aluminium sulphate.

In testimony of which invention, I have hereunto set my hand, at Philadelphia, Pennsylvania, on this 11th day of June, 1926.

OTTO HERTING.